United States Patent [19]

Maeda et al.

[11] Patent Number: 4,835,048
[45] Date of Patent: May 30, 1989

[54] OPTICAL INFORMATION RECORDING CARD USING PHASE SEPARATION OF POLYMER BLEND

[75] Inventors: Kazuhiko Maeda, Tokyo; Toshio Koishi, Sakado, both of Japan

[73] Assignee: Central Glass Company, Limited, Ube, Japan

[21] Appl. No.: 73,478

[22] Filed: Jul. 15, 1987

[30] Foreign Application Priority Data

Jul. 16, 1986 [JP] Japan .................. 61-165566

[51] Int. Cl.$^4$ .................. B32B 5/16; B32B 27/06
[52] U.S. Cl. .................. 428/323; 346/76 L; 346/135.1; 428/336; 428/421; 428/463; 428/913; 430/945
[58] Field of Search ............... 428/421, 913, 323, 336, 428/463; 525/153; 346/76 L, 135.1; 430/945, 944, 270, 275, 290

[56] References Cited

U.S. PATENT DOCUMENTS

| | | | |
|---|---|---|---|
| 4,141,873 | 2/1979 | Dohany | 428/421 X |
| 4,357,616 | 11/1982 | Terao et al. | 430/945 X |
| 4,617,350 | 10/1986 | Maeda et al. | 525/153 |
| 4,711,996 | 12/1987 | Drexler | 346/76 L |

FOREIGN PATENT DOCUMENTS 61-27910 2/1986 Japan .................. 525/153
61-10248 5/1986 Japan .................. 428/213

OTHER PUBLICATIONS

English translation of Japanese Pat. No. 61-27910, 15 pages, published Aug. 17, 1987.

*Primary Examiner*—Thomas J. Herbert
*Attorney, Agent, or Firm*—Fleit, Jacobson, Cohn & Price

[57] ABSTRACT

An information recording card using a semiconductor laser beam for writing and reading information. The card comprises a recording layer formed on one side of a card substrate and a light absorbing layer closely interposed between the substrate and the recording layer. The material of the recording layer is a polymer blend which comprises a copolymer of vinylidene fluoride and at least one F-containing comonomer, preferably hexafluoroacetone, and an acrylic or methacylic ester polymer and which exhibits phase separation by heating. The light absorbing layer is for efficiently absorbing laser light used for recording and transforming it into heat energy. A good embodiment of the light absorbing layer is a film of Bi or Te, and another good embodiment is a thin layer of a resin composition containing fine particles of at least one of Bi, Te and C dispersed in a thermoplastic or thermosetting resin.

10 Claims, 1 Drawing Sheet

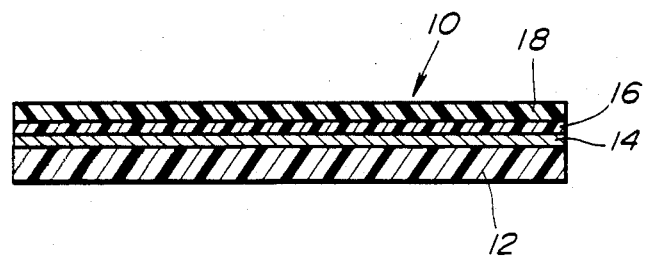

OPTICAL INFORMATION RECORDING CARD USING PHASE SEPARATION OF POLYMER BLEND

BACKGROUND OF THE INVENTION

This invention relates to an optical information recording card using a polymer blend that exhibits phase separation by heating as the recording material in which information can be written by a semiconductor laser beam.

With the rapid advance of semiconductor lasers in recent years, remarkable development has been achieved in optical memories which are advantageous over magnetic memories in the capability of very high density recording and also in excellence of durability by reason of noncontact recording and reproducing. For civil uses, optical disc memories of ROM type recorded with audio and/or video signals have already been commercialized by the names of compact disc, laser disc and optical disc. Besides, writable but inerasable optical disc memories of the so-called WORM (write once read mostly) type have been developed and are in practical use in some offices and public institutions.

Also efforts have been devoted to application of the technology of optical memories to plastic cards represented by credit cards and bank cards for enhancement of recording density and augmentation of recording capacity. In the conventional information recording cards using embossed characters or magnetic stripes for recording, recording capacity does not always suffice for needs. One way of enlarging the recording capacity is embedding an IC in the card. Actually, so-called IC cards having recording capacity of 16 KB are nearing to practical use. However, recording capacity of plastic cards can be further enlarged by utilizing an optical recording technique. In laboratories, optical information recording cards of ROM type larger than 200 KB in recording capacity have already been produced. Besides very high recording density, lowness of recording cost per bit will become an important merit of optical information recording cards. Rewritable optical information recording cards and WORM type optical information recording cards are also under development.

Known optical recording materials include colloidal organic materials in which silver particles are dispersed and metal salts for precipitation of metal particles by a sort of electroless plating process. In the case of using a semiconductor laser beam for recording of information, the laser beam is focussed to a very small spot on the surface of an optical recording layer and is guided so as to one-dimensionally write information into the recording layer. In such a case the material of the recording layer is usually an alloy or intermetallic compound which is fundamentally composed of Al, Te, Bi, Se, Sn, Tb, Co, Fe and/or In. Besides, there are proposals for use of organic pigments of cyanine type.

As to the above mentioned metallic recording material, a disadvantage is that most of the essential metals have toxicity and, hence, have to be handled with great care. This becomes a particularly serious matter of concern in the cases of information recording cards with which human bodies very frequently make direct contact. Besides, the metallic material is susceptible to oxidation or some corrosion and do not possess good storability. At present these shortcomings are coped with by providing a protective film on the recording layer. Nevertheless, the recording layer gradually deteriorates by oxidation or partial corrosion and consequently becomes low in recording sensitivity and/or reading sensitivity. Optical recording materials using organic pigments still involve various problems including insufficient stability and durability.

Meanwhile, U.S. Pat. No. 4,617,350 discloses a thermoplastic resin composition which is essentially a blend of an acrylic ester polymer and a copolymer of vinylidene fluoride and hexafluoropropane and which exhibits phase separation by heating and serves as a thermochromic material. Japanese patent application No. 61-27910 proposes an optical information recording card using a polymer blend of the type disclosed in U.S. Pat. No. 4,617,350 as the recording material in which information can be written by a semiconductor laser beam. This optical recording material is free from deterioration by oxidation or corrosion. However, this recording material is rather low in light absorbing efficiency in the wavelength range of semiconductor lasers and, hence, is insufficient in recording sensitivity.

SUMMARY OF THE INVENTION

It is an object of the present invention to provide an optical information recording card which uses a fluorine-containing polymer blend as the recording material and which has improved recording sensitivity to a semiconductor laser beam.

According to the invention, there is provided an optical information recording card comprising a card substrate, a recording layer which is formed on one side of the card substrate and which is formed of a polymer blend comprising a copolymer of vinylidene fluoride and at least one fluorine-containing comonomer as a first component and an acrylic or methacrylic ester polymer as a second component, and a light absorbing layer which is closely interposed between the card substrate and the recording layer and which absorbs light emitted from a semiconductor laser and transforms the light to heat energy.

Using a semiconductor laser, information is written in this recording card by the following process. The laser light incident on the recording layer enters the underlying light absorbing layer. Then the light is efficiently absorbed and transformed into heat energy. The recording layer receives heat from the light absorbing layer so that the polymer blend which constitutes the recording layer exhibits local phase separation into two microphases different in refractivity, whereby the information is recorded. The phase separation can be fixed by rapid cooling. However, the phase separation is reversible by slow cooling so that the written information is erasable if desired.

The polymer blend used as the recording material in this invention is nontoxic and is long stable. In an optical information recording card according to the invention, possibility of deterioration of the recording material further lessens because the laser light used for recording is scarcely absorbed in the recording layer. Furthermore, it is possible to reduce the power of semiconductor laser for recording by virtue of efficient absorption of laser light in the light absorbing layer.

A copolymer of vinylidene fluoride and hexafluoroacetone is particularly preferred as the first component of the polymer blend as the recording material.

As the principal material of the light absorbing layer it is particularly preferred to use at least one of bismuth, tellurium and carbon. A preferred embodiment of the light absorbing layer is a film of metallic Bi or Te. Another preferred embodiment of the same layer is a thin layer of a resin composition comprising fine particles of Bi, Te and/or C dispersed in a resin matrix.

BRIEF DESCRIPTION OF THE DRAWING

The single Figure is a schematic and sectional illustration of an optical information recording card according to the invention.

DESCRIPTION OF THE PREFERRED EMBODIMENTS

The Figure shows the construction of an optical information recording card 10 according to the invention. The card 10 is made up of a card substrate 12, an optical recording layer 16 formed over substantially the entire area or a selected partial area of the card substrate 12, a light absorbing layer 14 which is closely interposed between the substrate 12 and the recording layer 16 and a transparent protective layer 18 which closely covers the outer surface of the recording layer 16.

The material of the card substrate 12 is not particularly limited. It is usual to use a synthetic resin for general purposes, such as polyvinyl chloride resin, polystyrene resin, acrylic resin or fluororesin.

The optical recording layer 16 is formed of a polymer blend as defined hereinbefore. The first component of the polymer blend is a copolymer of vinylidene fluoride (VDF) and at least one fluorine-containing comonomer. It is suitable to select the comonomer(s) from trifluoroethylene, tetrafluoroethylene, chlorotrifluoroethylene, hexafluoroisobutene, hexafluoropropene, vinyl fluoride and hexafluoroacetone. Usually a binary copolymer is used, and in every case VDF occupies at least 50 mol % of the copolymer. The degree of polymerization of the copolymer may range from about 10 to about 10000. In this invention it is preferred to use a binary copolymer of VDF and hexafluoroacetone (HFA), and also it is preferred that the VDF-HFA copolymer comprises 0.1-20.0 mol % of HFA.

The second component of the polymer blend is an acrylic or methacrylic ester polymer which may be either a homopolymer or a copolymer. It is preferred to select the acrylic or methacrylic monomer(s) from methyl acrylate or methacrylate, ethyl acrylate or methacrylate, n-propyl acrylate or methacrylate, isopropyl acrylate or methacrylate, n-butyl acrylate or methacrylate, isobutyl acrylate or methacrylate and t-butyl acrylate or methacrylate. The degrees of polymerization of the acrylic or methacrylic ester polymer may range from about 10 to about 10000.

In blending the above described first and second polymer components, the proportion of the first component to the second component is widely variable over the range from about 10:90 to about 90:10. In the preferred case where the first component is a VDF-HFA copolymer, it is suitable that the VDF-HFA copolymer occupies 20–80 wt %, and preferably 30–75 wt %, of the polymer blend because the so composed polymer blend is fairly low in phase separation temperature.

A polymer blend for use as the recording material can be prepared and shaped into a film or sheet form by using conventional methods for blending and shaping of conventional thermoplastic resins. For example, the two polymers are blended and kneaded under appropriate heating in a conventional mixer such as Henschel mixer, V-type blender, ribbon blender, planetary mixer or rolls, and the obtained polymer blend is shaped into a sheet form by extrusion, injection molding, calendering or press-shaping. A solution coating or solution casting method is also practicable and is rather advantageous for obtaining a uniformly thin sheet or film of the desired polymer blend. In this method blending of the polymers is accomplished by dissolving the two polymers in an organic solvent common to the two polymers. A suitable solvent can be selected, for example, from esters, ketones and cyclic ethers.

In the present invention it is preferred to use at least one of Bi, Te and C as the principal material of the light absorbing layer 14.

More particularly, a preferred embodiment of the light absorbing layer 14 is a thin film of metallic Bi or Te. In this case a suitable thickness of the metal film 14 is from about 50 Å to about 1000 Å.

The light absorbing layer 14 of the metal film type can be formed by depositing Bi or Te on the surface of the card substrate 12 by a known technique such as vapor deposition or sputtering. After that a thin sheet of a polymer blend employed as the recording material is placed on the light absorbing layer 14 and is united with the substrate 12 by a suitable bonding method such as hot press-shaping, heat welding, ultrasonic welding or high-frequency welding. In general the operation temperature in the bonding operation is in the range from 80° to 300° C. though it depends on the employed method. In this way the optical recording layer 16 is provided on the light absorbing layer 14. Alternatively, the recording layer 16 is formed by applying a solution of the polymer blend to the card substrate 12 already coated with the light absorbing metal film 14 by using a suitable coating method such as spin coating, flow coating, spraying or brushing. Also it is possible to use a film applicator.

Another preferred embodiment of the light absorbing layer 14 is a film-like thin layer of a resin composition comprising a fine powder of at least one of Bi, Te and C uniformly dispersed in a resin matrix. The resin as the matrix material is either a thermoplastic resin such as polyvinyl chloride, polyvinyl acetate, polystyrene, polyethylene, polypropylene or acrylic resin or a thermosetting resin having a reactive group in its molecular chain. For example, the reactive group may be hydroxyl group, amino group or epoxy group. The thermosetting resin may be either of single-part type or of two-part type. The fine powder of Bi, Te and/or C is desired to be as small as possible in particle size and not to be larger than 2 $\mu$m in particle size. When the particle size is larger, absorption of light (transformed into heat) in the resin composition layer 14 may not be uniform in a microscopic sense so that recording pits formed in the recording layer 16 may become irregular in size. It is suitable that the content of a fine powder of Bi, Te and/or C in the resin composition is in the range from 20 to 75 wt %. If the content of the powder is less than 20 wt % the resin composition layer 14 will be insufficient in the capacity of absorbing light, and if the content of the powder is more than 75 wt % the resin composition layer 14 will become unsatisfactory in surface smoothness. A suitable thickness of the light absorbing layer 14 formed of the resin composition is from about 800 Å to about 10 $\mu$m.

A suitable method for dispersing a fine powder of Bi, Te and/or C in a resin depends on the type of the resin. In the case of using a thermoplastic resin the powder is uniformly dispersed in the resin by using a suitable mixing and kneading means such as Henschel mixer, V-type blender, ribbon blender, planetary mixer or rolls, and the mixture is shaped into a thin sheet by, for example, extrusion, injection molding, calendering or press-shaping. Then the light absorbing layer 14 is laid on the card substrate 12 by welding the sheet of the powder-containing resin composition to the substrate 12. After that the recording layer 16 is provided by a weld bonding method. Also it is possible to accomplish weld bonding of the light absorbing resin composition sheet (14) and the recording polymer blend sheet (16) simultaneously. In the case of using a thermosetting resin in the light absorbing layer 14, a fine powder of Bi, Te and/or C is dispersed in a solution of the resin, and the resultant dispersion is coated on the card substrate 12 followed by curing of the coating film. The light absorbing layer 14 formed by this method is superior in resistance to solvents and also in heat resistance, so that the operation of overlaying the light absorbing layer 14 with the recording layer 16 by either a weld bonding method or a coating method can easily and efficiently be accomplished.

The thickness of the recording layer 16 is from about 0.05 μm to about 3 μm, and a preferred range is from 0.5 to 10 μm.

The material of the protective layer 18 is a synthetic resin which is high in light transmittance. For example, polyvinyl chloride resin, polystyrene resin, acrylic resin or a fluororesin is used. The protective layer 18 can be provided by either a coating method or a heat welding method.

The invention is further illustrated by the following nonlimitative examples.

EXAMPLES 1-4

In each of these examples an optical information recording card of the construction shown in the Figure was produced by using a sheet of polyvinyl chloride resin as the substrate 12.

In every example the light absorbing layer 14 was formed by depositing a film of Bi on the substrate surface to a thickness of 500 Å by a vapor deposition technique.

The material of the recording layer 16 was a blend of 35 parts by weight of a copolymer of VDF (91 mol %) and HFA (9 mol %) and 65 parts by weight of an acrylic or methacrylic polymer indicated below.
Example 1: polymethyl methacrylate
Example 2: polyethyl acrylate
Example 3: copolymer of methyl methacrylate and n-butyl methacrylate
Example 4: copolymer of methyl methacrylate and t-butyl methacrylate In every example the polymer blend was dissolved in butyl acetate to obtain a solution in which the total content of polymers was 5 wt %. The solution was spread on the surface of the Bi film 14, and the solvent was allowed to evaporate at room temperature in a dehumidified atmosphere to thereby form a polymer blend film having a thickness of 5 μm as the recording layer 16. Then the transparent protective layer 18 was provided by pressure bonding of a polyvinyl chloride film.

EXAMPLE 5

The optical information recording card of Example 1 was modified only in that Te was used as the material of the light absorbing layer 14 in place of Bi in Example 1. The thickness of the Te film 14 was 500 Å.

The recording cards of Examples 1-5 were subjected to an optical recording test using a semiconductor laser (wavelength 830 nm). The laser beam was focussed on the recording card by using a collimating lens, beam splitter, quarter wave plate and objective lens (NA=0.5). The light power on the recording card was about 7 mW. As the result, circular recording pits were produced in the recording layer 16 of every recording card. In the cards of Examples 1, 2 and 5, the recording pits had a diameter of 3 mm. In the cards of Examples 3 and 4 the recording pits had a diameter of 5 mm.

EXAMPLES 6-8

In each of these examples an optical information recording card was produced almost in accordance with Example 1. As a sole point of difference, the light absorbing layer 14 was formed by using a resin composition containing Bi powder. That is, the light absorbing layer 14 was formed by the steps of dispersing a fine powder of Bi (about 0.1 μm in particle size) in a solution of a selected resin, coating the resultant dispersion on the card substrate 12 and drying and, when a thermosetting resin was used, curing the resin in the coating film. The thickness of the thus formed light absorbing layer 14 was 2 μm in every example. The resin in which the Bi powder was dispersed was thermoplastic polystyrene (radically polymerized) resin in Example 6, a thermosetting polyol-acrylate resin in Example 7 and a thermosetting polyurethane resin in Example 8.

EXAMPLES 9 AND 10

The optical information recording card of Example 8 was modified only in that, in place of the Bi powder in Example 8, a fine powder of Te (about 0.1 μm in particle size) was used in Example 9 and a fine powder of C (about 0.1 μm in particle size) in Example 10.

The recording cards produced in Examples 6-10 were subjected to the above described optical recording test. As the result, circular recording pits were produced in the recording layer 16 of every recording card. In the cards of Examples 6, 7, 8 and 10 the recording pits had a diameter of 2 mm. In the recording card of Example 9 the recording pits had a diameter of 3 mm.

EXAMPLE 11

In this case the material of the recording layer 16 was a blend of 50 parts by weight of the VDF-HFA copolyer used in Example 1 and 50 parts by weight of methyl methacrylate. Except the change in this point, the recording card manufacturing process of Example 1 was repeated.

The obtained recording card was tested by the above described method. As the result circular recording pits having a diameter of 3 mm were produced in the recording layer 16.

What is claimed is:
1. An optical information recording card, comprising:
a card substrate;
a recording layer formed on one side of said card substrate, said recording layer being formed of a polymer blend comprising a copolymer of vinylidene fluoride and hexafluoroacetone as a first component, said copolymer comprising 0.1 to 20 mol % hexafluoroacetone and balance vinylidene fluoride, and an acrylic or methacrylic ester polymer as a second component, wherein said polymer blend comprises 20 to 80 weight % of said copolymer; and a light absorbing layer comprising a light absorbing material selected from the group consisting of bismuth, tellurium and carbon, said light absorbing layer being closely interposed between said card substrate and said recording layer, and said light absorbing layer being capable of absorbing light emitted from a semiconductor laser and transforming the light to heat energy.

2. An information recording card according to claim 1, wherein said polymer blend comprises 30–75 wt % of said copolymer.

3. An information recording card according to claim 1, wherein said second component of said polymer blend is selected from the group consisting of homopolymers and copolymers of methyl acrylate, methyl methacrylate, ethyl acrylate, ethyl methacrylate, n-propyl acrylate, n-propyl methacrylate, n-butyl acrylate, n-butyl methacrylate, isobutyl acrylate, isobutyl methacrylate, t-butyl acrylate and t-butyl methacrylate.

4. An information recording card according to claim 1, wherein the thickness of said recording layer is in the range from 0.5 to 10 μm.

5. An information recording card according to claim 1, wherein said light absorbing layer further comprises a resin and said light absorbing material is in the form of fine particles dispersed in said resin.

6. An information recording card according to claim 5, wherein the thickness of said light absorbing layer is in the range from about 800 Å to about 10 μm.

7. An information recording card according to claim 5, wherein said fine particles are not larger than 2 μm in particle size.

8. An information recording card according to claim 7, wherein the content of said fine particles in said resin composition is in the range from 20 to 75 wt %.

9. An information recording card according to claim 1, wherein said light absorbing layer is a film of a metal selected from the group consisting of Bi and Te.

10. An information recording card according to claim 9, wherein the thickness of said film is in the range from about 50 Å to about 1000 Å.

* * * * *